United States Patent [19]

Naya et al.

[11] Patent Number: 4,508,023
[45] Date of Patent: Apr. 2, 1985

[54] EXTRACT GENERATING DEVICE

[75] Inventors: Masaru Naya, Tama; Tsuneichi Ikeda, Ibaraki, both of Japan

[73] Assignees: Tokyo Shibaura Denki Kabushiki Kaisha, Kawasaki; Kanazawa Industries, Asakusabashi, both of Japan

[21] Appl. No.: 575,684

[22] Filed: Jan. 31, 1984

[30] Foreign Application Priority Data

Feb. 28, 1983 [JP] Japan .................. 58-32041

[51] Int. Cl.³ ............................................. A47J 31/57
[52] U.S. Cl. ...................... 99/279; 99/284; 219/283
[58] Field of Search .............. 99/279, 280, 281, 282, 99/283, 284; 219/283; 62/165

[56] References Cited

U.S. PATENT DOCUMENTS

| 3,060,835 | 10/1962 | Eads et al. | 99/283 |
| 4,155,291 | 5/1979 | Ryckman, Jr. et al. | 99/283 |
| 4,165,681 | 8/1979 | Belinkoff | 99/280 |
| 4,196,658 | 4/1980 | Takagi et al. | 99/286 |
| 4,262,585 | 4/1981 | Leuschner et al. | 99/280 |
| 4,406,942 | 9/1983 | LoConti | 219/283 |

FOREIGN PATENT DOCUMENTS

| 2811497 | 6/1979 | Fed. Rep. of Germany . |
| 54-49283 | 4/1979 | Japan . |
| 55-6487 | 2/1980 | Japan . |
| 57-94423 | 6/1982 | Japan . |

Primary Examiner—Philip R. Coe
Assistant Examiner—Frankie L. Stinson
Attorney, Agent, or Firm—Cushman, Darby & Cushman

[57] ABSTRACT

An extract generator for producing either hot or cold beverages. A movable stand for maintaining the temperature of a hot beverage is placed in a first position below a hot water unit. Hot water from the unit passes through a filter device, in which it picks up the extract, to a jug, in which the extract accumulates. To generate cold beverages a cooling vessel is placed between the filter device and jug and the movable stand is moved to a second position so that the filtering device, cooling vessel and jug may be placed below the hot water unit but not on the movable stand.

10 Claims, 8 Drawing Figures

EXTRACT GENERATING DEVICE

BACKGROUND OF THE INVENTION

This invention relates to extract generating devices such as coffee makers.

Virtually all coffee makers and similar beverage extraction devices that have been available hitherto use a heater pump, which bring cold water to a boil and discharges it slowly as a result of the pressure generated by this boiling. Extraction is effected by pouring the discharged hot water on the ground coffee, etc. The jug in which the extracted coffee accumulates is kept hot by heat from the stand on which it is placed.

Hitherto, however, as shown in U.S. Pat. Nos. 4,196,658 and 4,262,585, all such devices were exclusively for the extraction of hot beverages, and it was impossible to use them to extract cold beverages.

In order to make ice coffee, for instance, with a conventional coffee maker or similar device, the practice has been to extract a small amount of strong coffee by means of the conventional extracting device, pour this extract into a pot containing ice, and adjust the amount, strength and temperature by stirring by hand. Not only is this a troublesome and time consuming way of obtaining the cold drink, but the flavor varies, and the aroma sometimes vanishes as a result of the stirring.

SUMMARY OF THE INVENTION

This invention was developed in the light of the situation described above.

The object of this invention is to provide an extract generating device whereby not only a hot drink but also an adequately cooled drink can be extracted without undue expenditure of time or trouble.

In this invention, a movable stand, for maintaining the temperature of a hot drink, is placed below a hot water unit on a fixed base or a table top. The fixed base, etc., itself has no temperature-maintaining function. A hot drink extractor, consisting of a jug and filtering device, is placed on the movable stand. A cold drink extractor, consisting of the above-mentioned jug and filtering device and a cooling vessel, is placed on the fixed base, etc., from which it can be freely removed.

With these features, hot beverages can be extracted by placing the hot drink extractor on the movable stand and supplying hot water to it by means of the hot water unit so that the beverage accumulates in the jug. The beverage can be kept hot by means of the movable stand. By removing the movable stand and placing the cold drink extractor on the fixed base, etc., cold drinks can be made. Thus, hot water from the hot water unit may be provided to the filtering device so that the beverage accumulates in the jug. The beverage can then be cooled by the ice in the cooling vessel.

In this way, hot or cold drinks can be extracted by the choice of the user, automatically and without undue expenditure of time and trouble. Since the jug is not heated when a cold drink is extracted, an adequately cooled drink can be obtained.

BRIEF DESCRIPTION OF THE DRAWING

These and other objects and advantages of the invention will become more apparent and more readily appreciated from the following detailed description of the presently preferred exemplary embodiment of the invention taken in conjunction with the accompanying drawings, of which.

DESCRIPTION OF THE PREFERRED EMBODIMENTS

Figure 1:
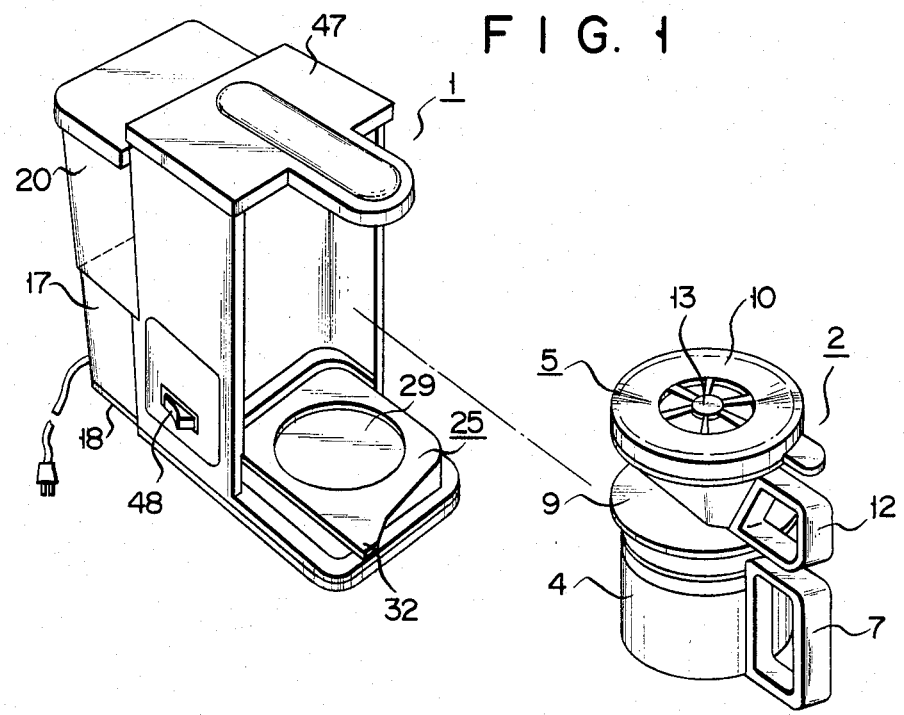
FIG. 1 is a perspective view of a first embodiment of this invention without cooling vessel.

An embodiment of the invention will be explained below, with reference to FIGS. 1–5. The extraction device consists of a hot water unit 1 and either a hot drink extractor 2 or a cold drink extractor 3. Hot drink extractor 2 includes a jug 4 and a filtering device 5 which are freely detachable from each other. Cold drink extractor 3 includes not only jug 4 and filtering device 5 but also a cooling vessel 6 removably fitted between jug 4 and filtering device 5. Ice A is placed in cooling vessel 6.

Jug 4 is made of a substance such as transparent heat-resistant glass. It is cylindrical in shape and has a base, and is provided on the outside with a handle 7. Filtering device 5 is formed from a filter cup 9, made of synthetic resin and having extraction holes 8 in its base, and from a distributor 10. Filter cup 9 has a projecting handle 12 on its outside. Inside, cup 9 supports a throw-away paper filter 11, which holds the substance for extraction B, such as ground coffee beans. Distributor 10 has a distributing part 13 which spreads the hot water as it is supplied, pouring it onto substance B.

Cooling vessel 6 is cylindrical in shape, provided with a base, and made of synthetic resin. It has a handle 14 at its upper edge, and percolation holes 15 and 16 in its base. Cooling vessel 6 rests on the rim of jug 4 in such a way that its base at least is immersed in the drink that accumulates inside jug 4. To effectively cool the extracted drink the size of cooling vessel 6 enables it to take a considerable amount of ice. For this reason, the height D (see FIG. 3) of hot drink extractor 2 (cooling vessel 6 not included) is less than the height C of cold drink extractor 3.

Hot water unit 1 includes body 17. The bottom of unit 1 is covered by bottom plate 18. Fixed base 19 projects front part of bottom plate 18 in this embodiment. Fixed base 19 is not provided with any heating function for maintaining temperature. In fact, cold drink extractor 3 is placed on its surface, where it stands free. Note that when cold drink extractor 3 is placed directly on a table or a desk, fixed base 19 is not necessary.

A water container 20 is provided in the rear part of body 17. Although container 20 may be fixed, in this embodiment it is removable. Container opening 22, which has within it a stop valve 21, is designed so that it can be inserted into and withdrawn from water supply port 23 provided in body 17. An O ring 24 forms a seal.

Figure 3:
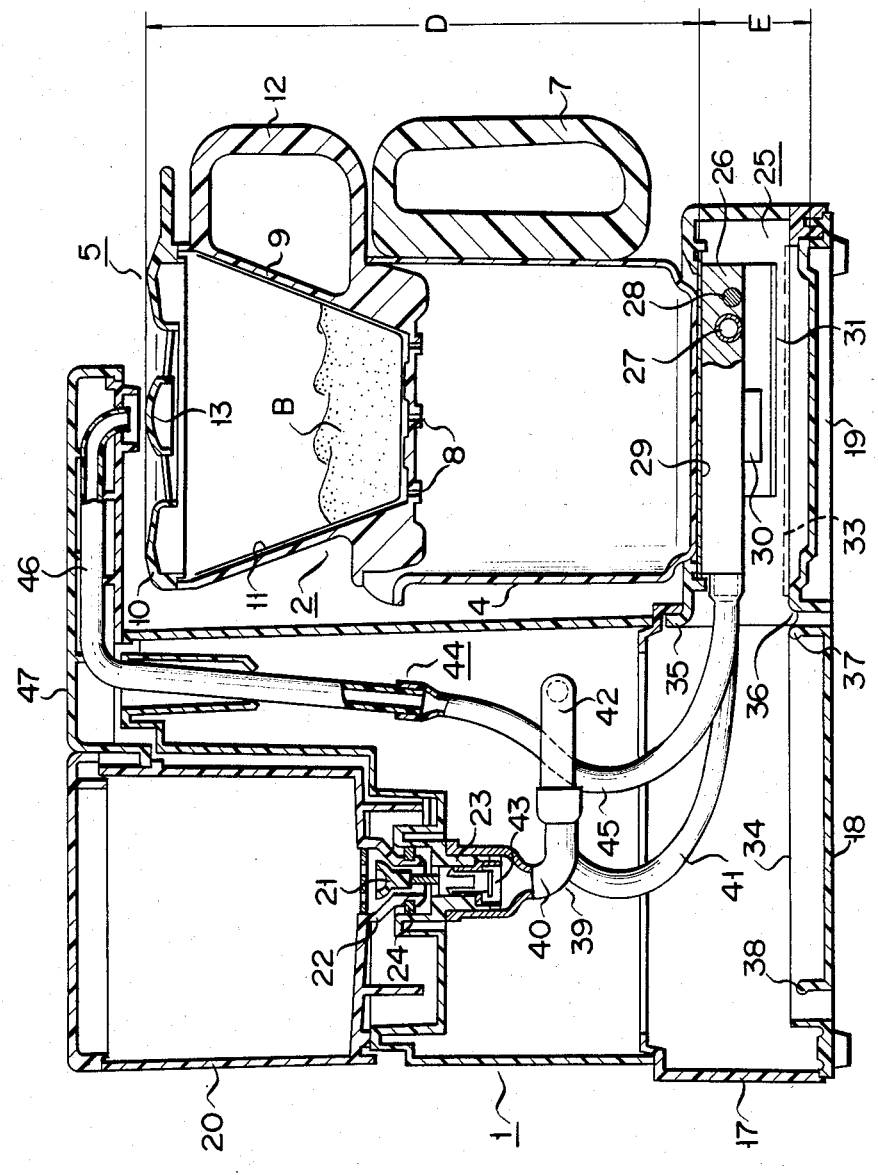
FIG. 3 is a side elevational view in section of the first embodiment without cooling vessel.
Figure 4:
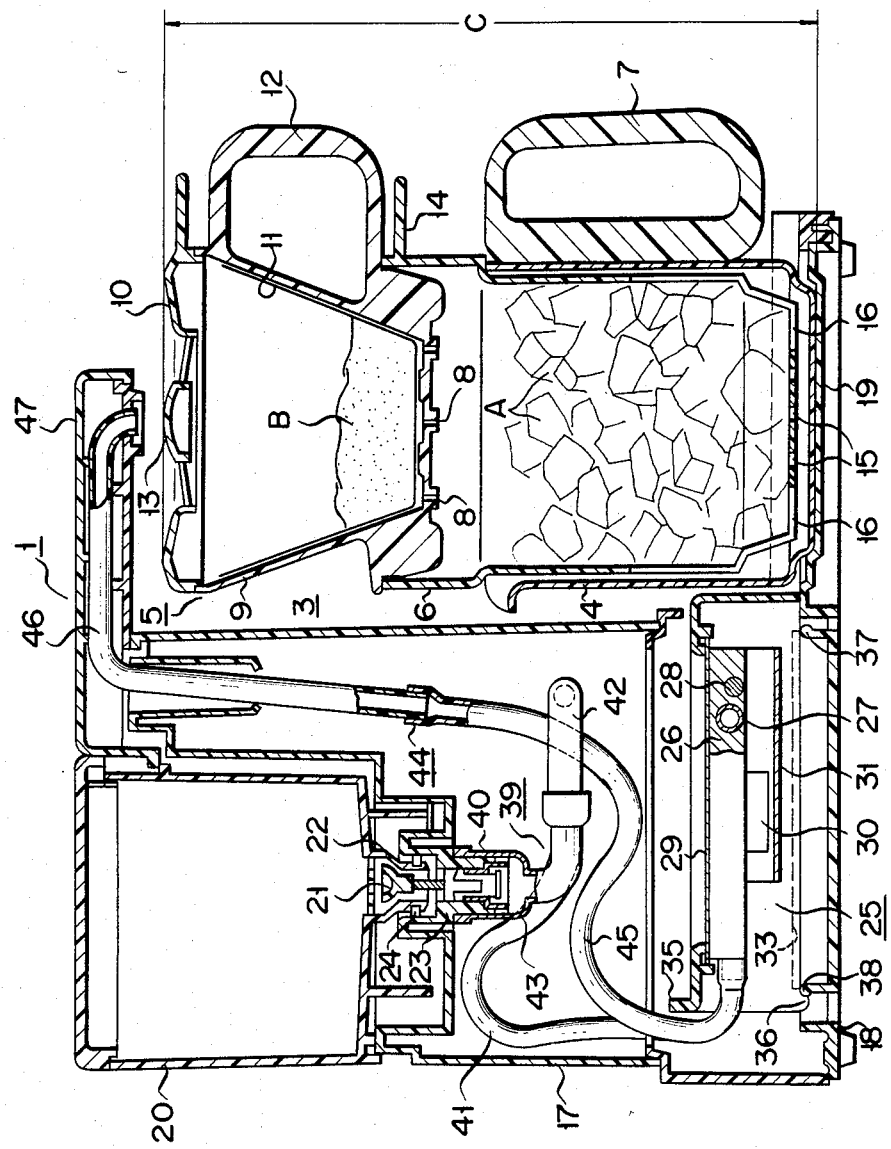
FIG. 4 is a side elevational view in section of the first embodiment with cooling vessel.

Hot water unit 1 is provided with a movable stand 25 which can be positioned on or removed from fixed base 19, so that the latter is either covered or exposed. Movable stand 25 contains the heater pump. In addition to having a roughly U-shaped heating tube 27 fitted to a hot plate 26 which is made of e.g. aluminum, movable stand 25 has a sheathed water heater 28 aligned with tube 27. The upper surface of hot plate 26 has a cover plate 29 of e.g. stainless steel attached to it. In FIGS. 3 and 4, a thermostat 30 and a heat shielded plate 31 are attached to removable stand 25.

Figure 2:
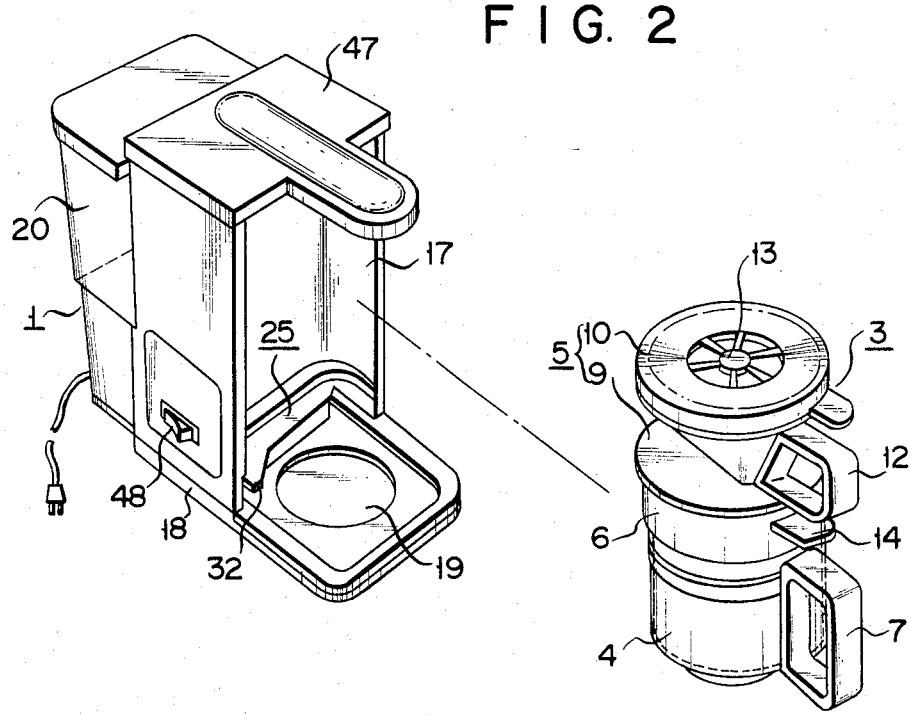
FIG. 2 is a perspective view of the first embodiment with cooling vessel.
Figure 5:
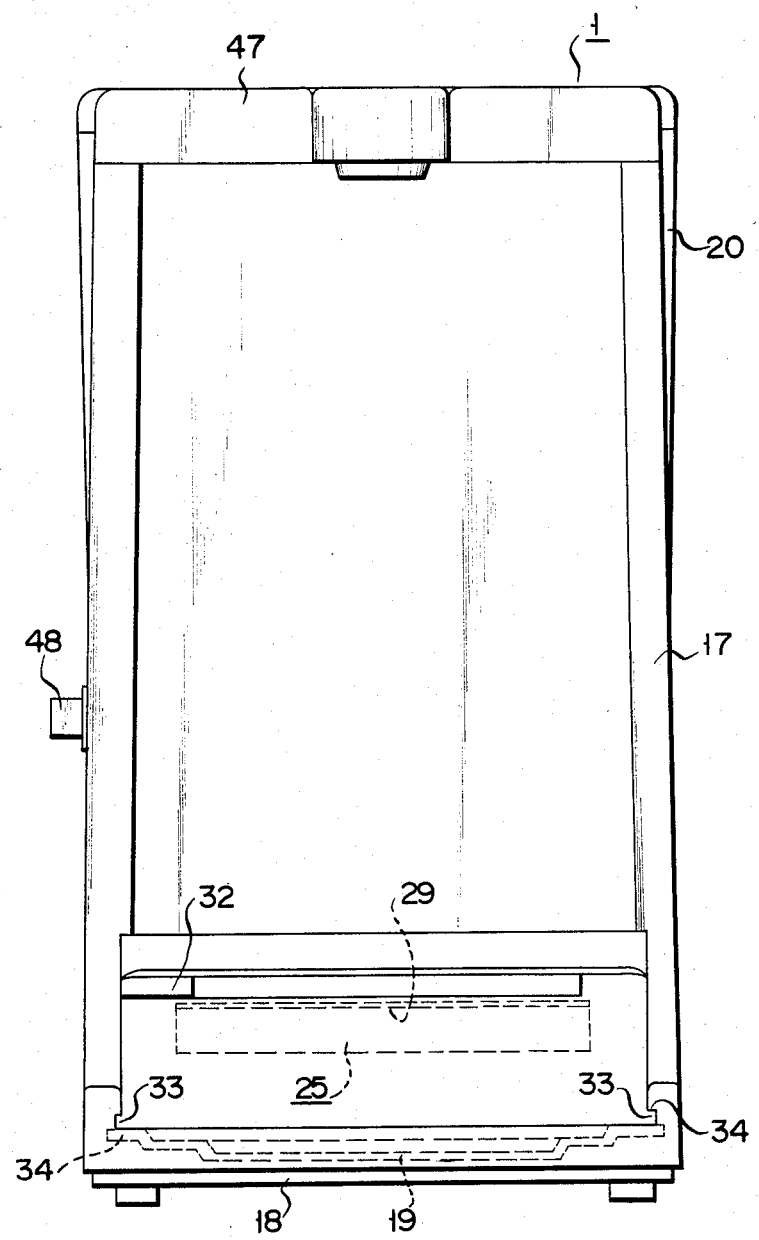
FIG. 5 is a front elevational view of the hot water unit of the first embodiment.

In this embodiment movable stand 25 can be moved back and forth by hand. When it is pulled forward, it covers fixed base 19, and when it is pushed back it disappears almost completely into body 17 leaving the fixed stand 19 exposed. In FIGS. 1, 2 and 5, a handle 32 projects forward from movable stand 25. In FIGS. 3 and 5 slides 33 project from both sides of movable stand 25. These slides slidably engage guides 34 provided on body 17 and bottom plate 18. A projecting lip 35 (see FIG. 3) stops the forward movement of movable stand 25. A projecting ridge 36 catches on, and can be withdrawn over projecting spring catches 37 and 38 which are formed integrally on bottom plate 18 which is made of synthetic resin. Ridge 36 and catches 37 and 38 cooperate to hold movable stand 25 in position.

Hot drink extractor 2 is placed, freestanding, in movable stand 25. The height E between cover plate 29 of movable stand 25 and the surface of fixed base 19, when movable stand 25 is placed over fixed base 19, is designed so that it is virtually the same as the difference between the height C and D of hot and cold drink extractors 2 and 3, respectively.

Water supply port 23 and heating tube 27 are connected by a water supply pipe system 39. Water supply pipe system 39 is made up of (for example) a rigid elbow pipe 40 joined to the water supply port 23, a flexible tube 41, of heat-resistant material, e.g. silicon rubber, which is joined to heating tube 27, and rigid U-shaped tube 42 connecting these two together. Check valve 43 prevents the reverse flow of water into water container 20 when boiling pressure is generated in the above-mentioned heater pump. An acceptable alternative to check valve 43 is to prevent reverse flow by providing an appropriate construction at a rigid part of the system.

Discharge pipe system 44 is connected to the outlet of heating tube 27. Pipe system 44 is made up of a flexible tube 45 of heat-resistant material, e.g. silicon rubber, joined at one end to heating tube 27, and a rigid discharge pipe 46 joined to the other end of tube 45. The outlet of discharge pipe 46 directs water to the center of filtering device 5.

Cover 47 of body 17 and a switch actuator 48 are shown in the drawings.

An explanation follows of the working of the embodiment described above. To obtain hot coffee, etc., all that is required is to pull out movable stand 25 over fixed base 19, as illustrated in FIGS. 1 and 3. Then filter cup 9 is filled with substance for extraction B, i.e., ground coffee beans, etc., and hot drink extractor 2 is placed on cover plate 29 of movable stand 25. Switch actuator 48 is then operated so that current passes to heater 28 in movable stand 25.

Whenever the water in heating tube 27 boils, the boiling pressure will activate the heater pump, so that hot water is discharged in spurts into discharge pipe system 44. Each time a small quantity of hot water is discharged, it is spread by distributing part 13 onto substance for extraction B, thus effecting extraction of coffee, etc. The extracted coffee, etc., flows down from extraction holes 8 to accumulate in jug 4, where it is kept hot by heat conduction from movable stand 25.

To obtain cold coffee, etc., movable stand 25 is pushed back into body 17, as illustrated in FIGS. 2 and 4, exposing fixed stand 19. Then cold drink extractor 3 is placed on fixed stand 19. Cooling vessel 6 of extractor 3 will have been filled with ice A. All that remains is to activate the heater pump by passing current to heater 28 of movable stand 25. When this is done, the hot coffee, etc., extracted by the hot water in filtering device 5 is cooled by ice A in cooling vessel 6 and accumulates in jug 4. In this case, jug 4 is not kept hot by movable stand 25.

The movement of movable stand 25 which is required to switch between hot and cold beverages is possible by virtue of the flexibility of flexible tubes 41 and 45.

In this embodiment, at least the base of the cooling vessel 6 with percolation holes 15 and 16 is immersed into the drink accumulating in jug 4. As a result, the drink achieves good contact with ice A. Also cold drinks can be obtained with minimal temperature variations due to the agitation of the drink when cooling vessel 6 is removed from jug 4.

Note that since the height E of movable stand 25 is equal to the difference between the respective heights of extractors 2 and 3, the distance between the outlet of pipe system 44 and distributing part 13 is virtually the same whichever of the two extractors is selected for use. Therefore, no difference exists in the manner in which the hot water is spread.

The invention is not restricted to the embodiment described above. As indicated by the second embodiment, illustrated in FIG. 6, movable stand 25 may be attached to body 17 by means of a pivot pin 49, enabling it to be pivoted in a horizontal plane. Opening 50 permits concealment of stand 25 in the side of body 17, in the case of this embodiment. When the hot drink extractor (not illustrated) is used, stand 25 may be swung round to cover fixed stand 19. When the cold drink extractor (not illustrated) is used, movable stand 25 may be pushed through opening 50 and stored inside body 17, exposing fixed stand 19.

Figure 7:
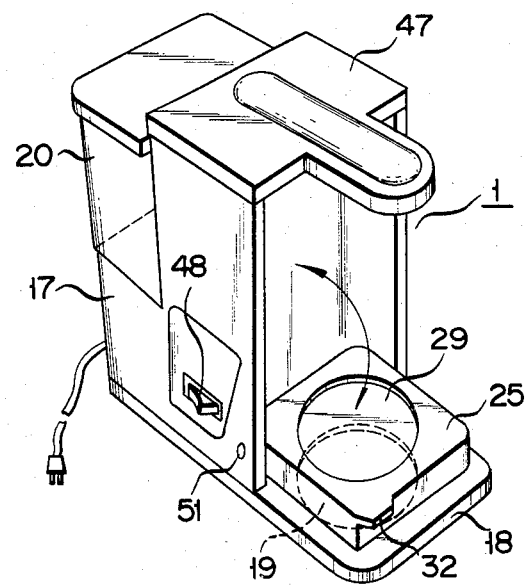

In the embodiment illustrated in FIG. 7, movable stand 25 may pivot about horizontal pin 51 so that movable stand 25 may lie vertically off of fixed base 19 during the making of cold drinks.

Figure 8:
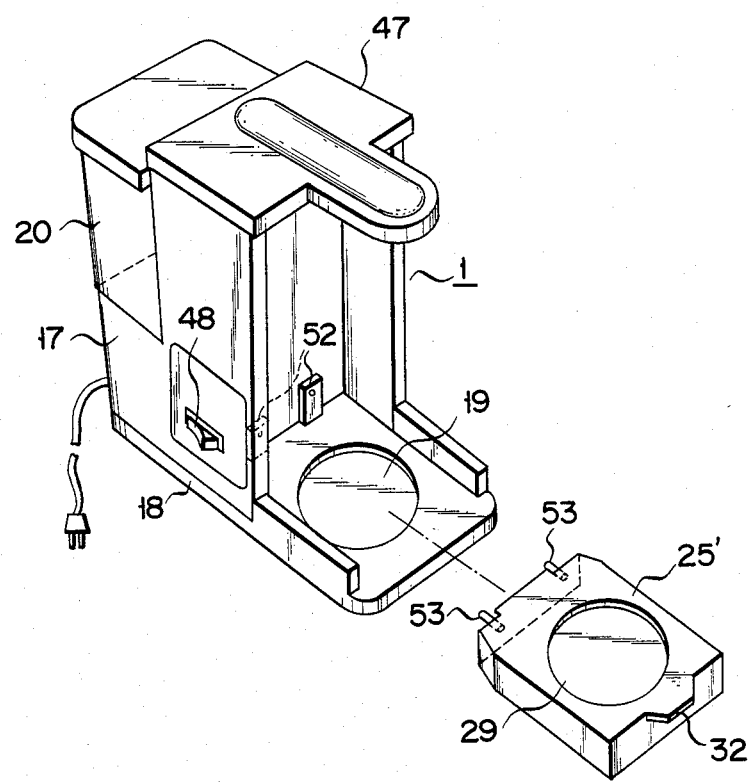

In the embodiment illustrated in FIG. 8, stand 25' may be made completely detachable from body 17. In this case, however, the heater pump, etc., is mounted inside body 17 and stand 25' is provided with a heater to keep the drink hot. In this embodiment, movable stand 25' is fillted to body 17, over fixed stand 19, when hot drink extractor 2 is used. Cold drink extractor 3 can be used by removing movable stand 25' to expose fixed stand 19 on which cold drink extractor 3 is then placed. In FIG. 8, pins 53, connected to the heater in movable stand 25' may be plugged into sockets 52 in body 17, enabling a connection to be made in parallel with the heater of the heater pump so that a hot drink can be kept hot.

Figure 6:
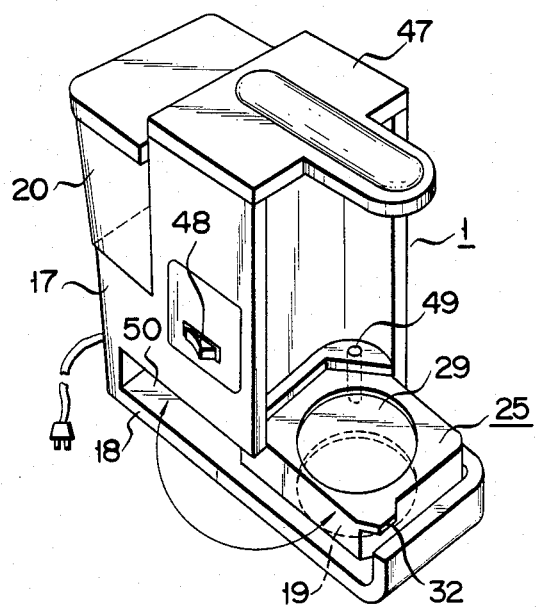
FIGS. 6–8 are perspective views of different embodiments of this invention.

In all respects other than those explained above, the layouts of the embodiments illustrated in FIGS. 6-8 are the same as for the first embodiment illustrated in FIGS. 1-5. The same symbols have therefore been used, without repetition of the explanation in each case.

Further, in the embodiments described above movable stand 25 is constructed so as to effect the heater pump action whidh produces the hot water. Those skilled in the art would readily appreciate that a different construction could be employed. For example, a heater may be provided for keeping a hot drink hot but without the heater pump function. Hot water can be supplied by a method other than that of the heater pump. Also, the design can be such that cooling vessel 6 is contained completely within jug 4.

Although only a few exemplary embodiments of this invention have been described in detail above, those skilled in the art will readily appreciate that many modifications are possible in the exemplary embodiments without materially departing from the novel teachings and advantages of this invention. For example, the specific construction, shape, position, or materials, etc., of the hot water unit, fixed stand, movable stand, jug, filtering device, cooling vessel, etc., may be embodied in various other forms.

Accordingly, all such modifications are intended to be included within the scope of this invention as defined in the following claims.

What is claimed is:

1. A device for producing an extract comprising:
   a hot drink extractor including a jug and a filtering device;
   a cooling vessel removably disposed between the jug and the filtering device and which is to be filled with ice, the cooling vessel, the jug and the filtering device forming a cold drink extractor;
   hot water means for producing hot water and discharging the hot water into said filtering device; and
   a movable stand, attached to the hot water means for movement between a first position in which the hot drink extractor can be freely placed on or removed from said movable stand and a second, retracted position in which said cold drink extractor can be positioned to receive hot water from hot water means, said movable stand including means for keeping the jug hot when said movable stand is in said first position.

2. A device according to claim 1, further comprising a fixed base formed at the base of the hot water means, the cold drink extractor being placed on said fixed base to receive the hot water;
   the movable stand being movably attached to the fixed base.

3. A device according to claim 1, wherein the keeping means of the hot water means includes an electric heater.

4. A device according to claim 1, wherein the movable stand is disposed in a portion of the hot water means in the second position.

5. A device according to claim 4, wherein the portion is provided at the bottom of the hot water means.

6. A device according to claim 5, wherein the movable stand is slidably attached to the water means.

7. A device according to claim 4, wherein the portion is provided on the side of the hot water means which is located adjacent to the movable stand.

8. A device according to claim 7, wherein the movable stand is pivotably attached to the hot water means.

9. A device according to claim 1, wherein the movable stand is detachable from the hot water means.

10. A device according to claim 1, further comprising:
    a water container; and
    a flexible pipe interconnecting the water container and the movable stand.

* * * * *

UNITED STATES PATENT AND TRADEMARK OFFICE
CERTIFICATE OF CORRECTION

PATENT NO. : 4,508,023
DATED : April 2, 1985
INVENTOR(S) : Masaru Naya, Tsuneichi Ikeda It is certified that error appears in the above-identified patent and that said Letters Patent is hereby corrected as shown below: On the title page;

In the above-identified patent, please change "[73] Assignees: Kanazawa Industries" to --[73] Assignees: Kanazawa Industries Co., Ltd.--

Signed and Sealed this

Eighth Day of October 1985

[SEAL]

Attest:

Attesting Officer

DONALD J. QUIGG

Commissioner of Patents and Trademarks—Designate